May 7, 1946.  E. C. WAHLBERG  2,399,699
ELECTRIC CONTROL CIRCUIT
Filed April 26, 1943  3 Sheets-Sheet 1

Fig. 1.

INVENTOR.
Eric C. Wahlberg
BY
Thomas C. Betts
Attorney

May 7, 1946. E. C. WAHLBERG 2,399,699
ELECTRIC CONTROL CIRCUIT
Filed April 26, 1943 3 Sheets-Sheet 2

Fig. 2.

INVENTOR.
Eric C. Wahlberg
BY
Thomas C. Betts
Attorney

UNITED STATES PATENT OFFICE 2,399,699

ELECTRIC CONTROL CIRCUIT

Eric C. Wahlberg, Stamford, Conn., assignor to Electrolux Corporation, Old Greenwich, Conn., a corporation of Delaware Application April 26, 1943, Serial No. 484,531

25 Claims. (Cl. 172—239)

My invention relates to automatic relay circuits and more particularly to such circuits for controlling the starting, running in forward and reverse directions, and stopping of synchronously operating direct current motors of the type disclosed in my copending applications Serial No. 428,018 filed January 24, 1942, and Serial No. 472,464 filed January 15, 1943.

In Serial No. 428,018 there is shown a plurality of direct current motors which are caused to run in synchronism by virtue of a three wire connection through suitable slip rings between three similar points in the armature windings of the motors. As disclosed in said application, the armatures of the several motors may be angularly positioned before starting by applying direct current across any two of these wires. After the motors have been positioned, the direct current supply to these two wires is interrupted and current is supplied to the armatures through the commutators of the motors in the usual manner. Thereupon, the motors start and run in synchronism due to the aforementioned three wire connection. The motors may be stopped in synchronism and their armatures angularly positioned with respect to each other by interrupting the current to the commutators and again applying direct current across two of the three wires.

As disclosed in application Serial No. 472,464, satisfactory synchronous operation of a plurality of direct current motors may be obtained by a two wire connection between similar points of the armature windings. The control circuits in accordance with the present invention are suitable for controlling the operation of motors provided with either a three wire or a two wire connection between their armatures, but in the following only two wire connections will be described.

A further object of my invention is to provide suitable control circuits for the specific purpose of controlling motors used to operate the landing flaps on an airplane and to operate both the landing and diving flaps on a dive bomber.

Further objects and advantages of my invention will be apparent from the following description considered in connection with the accompanying drawings which form a part of this specification and of which—

Figure 1:
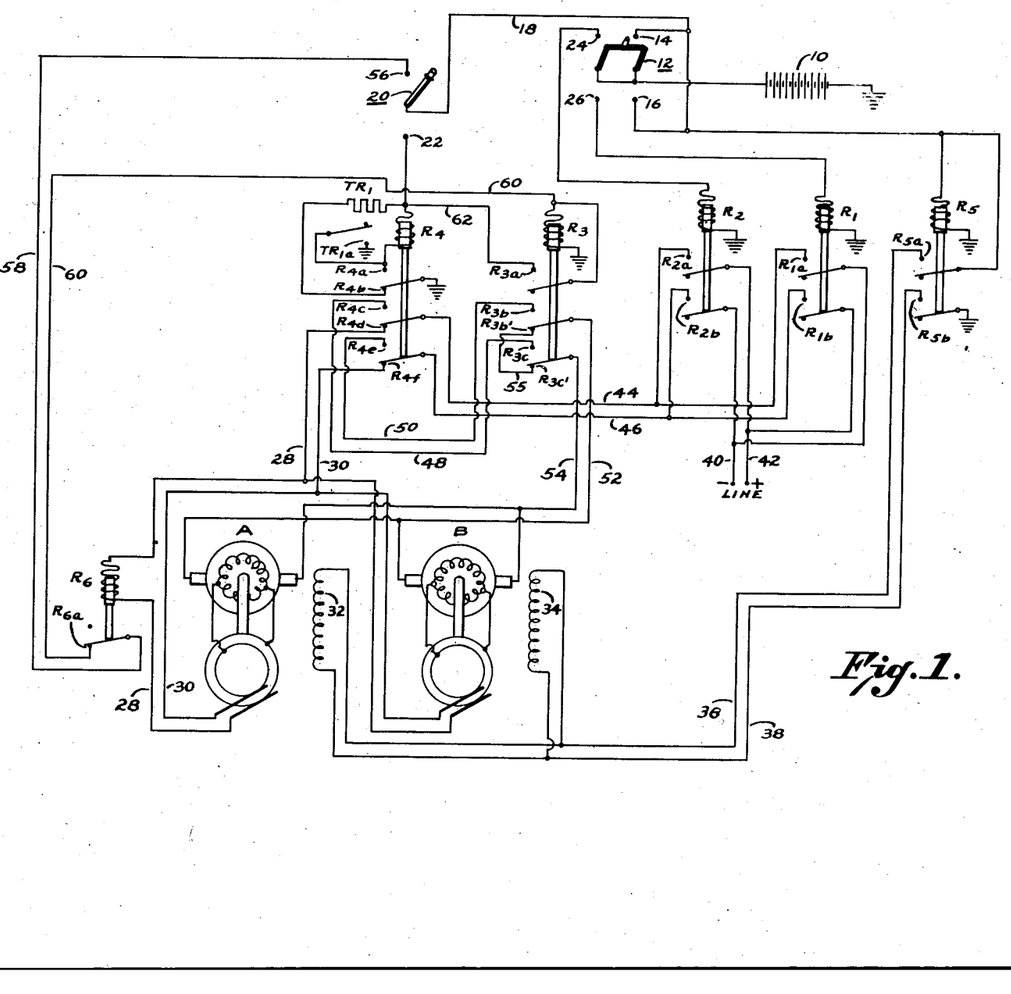
Fig. 1 is a wiring diagram illustrating one embodiment of my invention.

Referring more particularly to Fig. 1, reference character 10 designates a source of direct current, such as a twelve cell, 24 volt storage battery, one terminal of which is grounded while the other is connected to both blades of a double pole double throw switch 12. Contacts 14 and 16 of this switch are connected together by means of a conductor 18 which is also connected to the blade of a single pole double throw switch 20. One of the terminals 22 of this switch is connected directly to the solenoid of a triple pole magnetic relay $R_4$. The other terminal of the solenoid is connected to a normally open contact $R_{4a}$ of this relay and to the blade of a thermal relay $TR_1$. The normally open contact $TR_{1a}$ of this thermal relay is connected to ground. One terminal of the heating element of the thermal relay is connected to the normally closed contact $R_{4b}$, while the other terminal of the heating element is connected to the contact 22 of the single pole double throw switch 20. The blade of relay $R_4$ which cooperates with contacts $R_{4a}$ and $R_{4b}$ is connected to ground.

Contact 24 of the double pole switch 12 is connected to the solenoid of a double pole relay $R_2$, the other terminal of which is grounded. The contact 26 of the double pole switch is connected to the solenoid of a double pole relay $R_1$, the other terminal of which is likewise grounded.

The solenoid of a double pole relay $R_5$ is connected to both of the contacts 14 and 16 of the double pole switch and to ground.

Reference characters A and B designate two similar direct current motors, each of which is provided with a pair of slip rings which are connected to two similar points of the respective armature windings. The brushes cooperating with these slip rings are connected together by means of conductors 28 and 30. The solenoid of a relay $R_6$ is interposed in one or the other of these conductors, for instance in the conductor 28. The field windings 32 and 34 of the motors A and B, respectively, are connected in parallel to the conductors 36 and 38 which lead to the normally open contacts $R_{6a}$ and $R_{6b}$, respectively, of the relay $R_6$. The blade of this relay which cooperates with the contact $R_{6a}$ is connected to both the contacts 14 and 16 of the double pole switch 12, while the blade which cooperates with the contact $R_{6b}$ is connected to ground.

Conductors 40 and 42 are connected to any suitable source of direct current. Conductor 40 leads to the blade of relay $R_2$ which cooperates with contact R₂ᵦ, and to the blade of relay R₁ which cooperates with contact R₁ₐ, while conductor 42 leads to the blade of relay R₂ which cooperates with the contact of R₂ₐ, and to the blade of R₁ which cooperates with contact R₁ᵦ. Contacts R₁ₐ and R₂ₐ are connected together by means of a conductor 44, while contacts R₁ᵦ and R₂ᵦ are connected together by means of conductor 46. Thus, R₁ and R₂ constitute reversing relays for changing the polarity of the current in the conductors 44 and 46.

Conductor 44 is connected to the blade of relay R₄ which cooperates with the normally open contact R₄c and the normally closed contact R₄d, while conductor 46 is connected to the blade of this relay which cooperates with the normally open contact R₄e and normally closed contact R₄f. Contacts R₄d and R₄f are connected to conductors 28 and 30, respectively. The contacts R₄c and R₄e are connected by means of conductors 48 and 50 with the normally open contacts R₃c and R₃b, respectively, of a relay R₃. The blades cooperating with contacts R₃b and R₃c, respectively, are connected through conductors 52 and 54, respectively, with the brushes of motors A and B, the armatures of these motors being connected in parallel. A conductor 55 connects the normally closed contacts R₃b' and R₃c' together to provide a dynamic braking circuit.

The contact 56 of single pole double throw switch 20 is connected through conductor 58 to the blade of the relay R₅, the normally closed contact R₅ₐ of which is connected through the conductor 60 to one side of the solenoid of relay R₃, the other side of which is grounded. Conductor 60 is also connected to the blade of relay R₃ which cooperates with the normally open contact R₃ₐ. This contact is connected by conductor 62 with the coil of relay R₄ and with the heating element of thermal relay TR₁.

In the drawings all of the relays are shown in their deenergized positions, under which conditions the motors are at rest with all circuits open. When it is desired to start the motors in one direction of rotation, the switch 12 is thrown to the upper position, that is, with the blades closing the contacts 14 and 24, and the switch 20 is also thrown to the upper position, which closes the contact 56. Current thus flows from the battery 10 through the contact 14 of switch 12, the conductor 18, the contact 56 of switch 20, the conductor 58, the contact R₅ₐ and the conductor 60 to thus energize the relay R₃. Consequently, the contacts R₃ₐ, R₃ᵦ, and R₃c are closed and the contacts R₃b' and R₃c' are open. Current also flows from the conductor 60 through contact R₃ₐ and conductor 62 to the heating element of relay TR₁ from where it flows through contact R₄ᵦ to ground. Contact TR₁ₐ is open, as shown in the wiring diagram, but will close after a predetermined lapse of time due to the heating element.

Relay R₄ is not energized because contacts R₄ₐ and TR₁ₐ are both open. Consequently, contacts R₄ᵦ, R₄d, and R₄f are closed, while R₄ₐ, R₄c, and R₄e are open.

Closing of the contact 24 of switch 12 supplies current directly to the relay R₂, thus energizing it and closing its contacts R₂ₐ and R₂ᵦ. Relay R₁, being connected to the open contact 26 of switch 12 is not energized and its contacts R₁ₐ and R₁ᵦ remain open. The closing of contact 14 of switch 12 supplies current to relay R₅, thus energizing it and closing its contacts R₅ₐ and R₅ᵦ.

While the relays are in the condition just described, the following circuits to the motor are completed.

The field windings 32 and 34 are excited by current supplied through the closed contacts R₅ₐ and R₅ᵦ and the conductors 36 and 38. Current from the line 40, 42 flows through the closed contacts R₂ₐ and R₂ᵦ, the conductors 44 and 46, the normally closed contacts R₄d and R₄f and the conductors 28 and 30 to the slip rings of the motors A and B. Thus, the fields being excited and direct current supplied to similar points in the armature windings of the two motors, the armatures will be angularly positioned with respect to each other, in accordance with the disclosure in the application Serial No. 428,018.

The manual switches 12 and 20 being left in the same position, as soon as the heating element of thermal relay TR₁ has become heated, contact TR₁ₐ closes so as to complete the circuit of the solenoid of relay R₄ through contact 56 of switch 20, conductor 58, contact R₅ₐ, conductor 60, contact R₃ₐ, conductor 62, and contact TR₁ₐ to ground. The actuation of relay R₄ closes contact R₄ₐ and opens contact R₄ᵦ. Thus, the circuit through the coil of relay R₄ to ground is completed through contact R₄ₐ, while the circuit through the heating element of TR₁ is open, permitting the element to cool and the contact TR₁ₐ thereof to open. However, the relay R₄ remains energized through its own holding circuit including the contact R₄ₐ. The energizing of relay R₄ closes contacts R₄c and R₄e and opens contacts R₄d and R₄f. Consequently, the flow of line current to the conductors 28 and 30 leading to the slip rings is interrupted and this current now flows through the conductors 48 and 50, the closed contacts R₃b and R₃c of energized relay R₃ and the conductors 52 and 54 to the commutators of the motors A and B. The conductors 52 and 54 are not short-circuited through conductor 55 because contacts R₃b' and R₃c' are open. The motors now start and are caused to run in synchronism because of the conductors 28 and 30 which connect the slip rings of the motors.

The motors will ordinarily continue to run in this manner until the single pole switch 20 is thrown to its lower position so as to open contact 56 and close contact 22. Inasmuch as switch 12 has not been actuated, relays R₂ and R₅ are still energized as before and R₁ is still deenergized. However, opening of contact 56 has opened the circuit to the solenoid of relay R₃ and this relay is deenergized so as to open its contacts R₃ₐ, R₃ᵦ, and R₃c and to close contacts R₃b' and R₃c'. During the time it takes to throw the switch 20 from its upper to its lower position, the relay R₄ is deenergized so that its contacts R₄ᵦ, R₄d, and R₄f are closed while its contacts R₄ₐ, R₄c, and R₄e are open. Closing of contact 22 serves to complete a circuit through the heating element of thermal TR₁ and contact R₄ᵦ to ground. Contact TR₁ₐ is open, but will close after a predetermined lapse of time. Under these conditions current from the line 40, 42 passes through the closed contacts R₂ₐ and R₂ᵦ, the conductors 44 and 46, the closed contacts R₄d and R₄f and the conductors 28 and 30 to the slip rings of the motor. Due to the opening of contacts R₄c and R₄e, as well as the opening of contacts R₃b and R₃c, the supply of current to the commutators of the motor is interrupted and the commutators are short-circuited through the closed contacts R₃b' and R₃c' and the conductor 55. This causes the motors to be dynamically braked and angularly positioned, for the reasons pointed out in application Serial No. 428,018.

As soon as the heating of $TR_1$ has closed contact $TR_{1a}$, relay $R_4$ is energized through contact 22 and contact $TR_{1a}$ to ground. This closes contacts $R_{4a}$, $R_{4c}$, and $R_{4e}$ while opening contacts $R_{4b}$, $R_{4d}$, and $R_{4f}$. The closing of contact $R_{4a}$ completes the holding circuit for relay $R_4$ and maintains this relay energized, while the opening of contact $R_{4b}$ interrupts the supply of current to $TR_1$. The opening of contacts $R_{4d}$ and $R_{4f}$ interrupts the supply of current to contact $R_{4d}$ and $R_{4f}$ and hence to conductors 28 and 30 connected to the slip rings. While contacts $R_{4c}$ and $R_{4e}$ are closed while relay $R_4$ is energized, nevertheless the circuit to the commutators of the motors is not completed because contacts $R_{3b}$ and $R_{3c}$ are open.

The motors are now stopped with their armatures angularly positioned with respect to each other and all of the motor circuits are open. The switches 12 and 20 should then be thrown to neutral position in order to deenergize all of the relays.

If, during synchronous operation of the motors A and B, the motors are subjected to loads of greatly different magnitudes, a current of high amperage will flow through the conductors 28 and 30 attempting to hold the motors in synchronism. In order to prevent damage to the motors and to prevent them from operating out of synchronism, the current operated relay $R_6$ is connected in series with the conductor 28. At a certain value of current, preferably a value just below that at which the motors will drop out of synchronism, the contact $R_{6a}$ opens, thus interrupting the supply of current to the relay $R_3$, which results in the deenergizing of this relay and the opening of its contacts $R_{3a}$, $R_{3b}$, and $R_{3c}$ and the closing of contacts $R_{3b'}$ and $R_{3c'}$. The opening of contact $R_{3a}$ deenergizes relay $R_4$ with the result that its contacts $R_{4b}$, $R_{4d}$, and $R_{4f}$ are closed while its contacts $R_{4a}$, $R_{4c}$, and $R_{4e}$ are open. Consequently, line current is supplied through the conductors 44 and 46, the closed contacts $R_{4d}$ and $R_{4f}$ and the conductors 28 and 30 to the slip rings of the motors, while the supply of current to the commutators is interrupted by the opening of contacts $R_{4c}$ and $R_{4f}$ as well as by the opening of contacts $R_{3b}$ and $R_{3c}$. The closing of contacts $R_{3b'}$ and $R_{3c'}$ short-circuits the commutator brushes and the motors are dynamically braked and angularly positioned in the same manner as previously described.

Stopping of the motors eliminates the high current flowing through the conductors 28 and 30 and consequently relay $R_6$ is deenergized and its contact $R_{6a}$ closes. This in turn energizes relay $R_3$ so as to close its contacts $R_{3a}$, $R_{3b}$, and $R_{3c}$ and open contacts $R_{3b'}$ and $R_{3c'}$. Closing of contact $R_{3a}$ supplies current to the heating element of $TR_1$ and, as soon as $TR_{1a}$ closes, the relay $R_4$ is energized in the same manner as was described when switch 20 was first thrown to its upper position. Consequently, the motors will again start and run in synchronism unless the condition of unbalance of their respective loads still obtains, in which event $R_{6a}$ will again open.

If it is desired to operate the motors A and B in the reverse direction, they are started by throwing the switch 20 to its upper position and the switch 12 to its lower position. The sequence of operations previously described will occur with the exception that, with the switch 12 in its lower position, the relay $R_2$ will not be energized and the relay $R_1$ will be directly energized by the closing of contact 26. This results in reversing the polarity of the current in the conductors 44 and 46. Thus, if the conductor 42 is connected to the positive side of the line, the conductor 46 will carry positive current if the relay $R_1$ is energized so as to close its contacts $R_{1a}$ and $R_{1b}$. However, if relay $R_2$ is energized, the positive conductor 42 will be connected through contact $R_{2a}$ to conductor 44. Inasmuch as the polarity of the field is not reversed, the motors will now operate in a reverse direction. Relay $R_5$ is energized whenever switch 12 is closed in either position, inasmuch as contacts 14 and 16 are connected together. For the same reason, current will be supplied to the blade of switch 20 whenever switch 12 is closed in either position.

While relay $R_5$ has been shown for controlling excitation current supplied to the field circuit, this relay may be omitted if it is not felt necessary to open the grounded conductor 38. As shown, the solenoid of relay $R_5$ is connected to both contacts 14 and 16 of double pole switch 12, and hence the relay is energized and its contacts $R_{5a}$ and $R_{5b}$ are closed whenever switch 12 is closed in either direction. It follows, therefore, that the fields 32 and 34 are excited whenever switch 12 is closed, and are not excited whenever the switch is open. Obviously, the same result would be obtained if conductor 36 were connected directly to contacts 14 and 16, and conductor 38 were permanently grounded.

Figure 2:
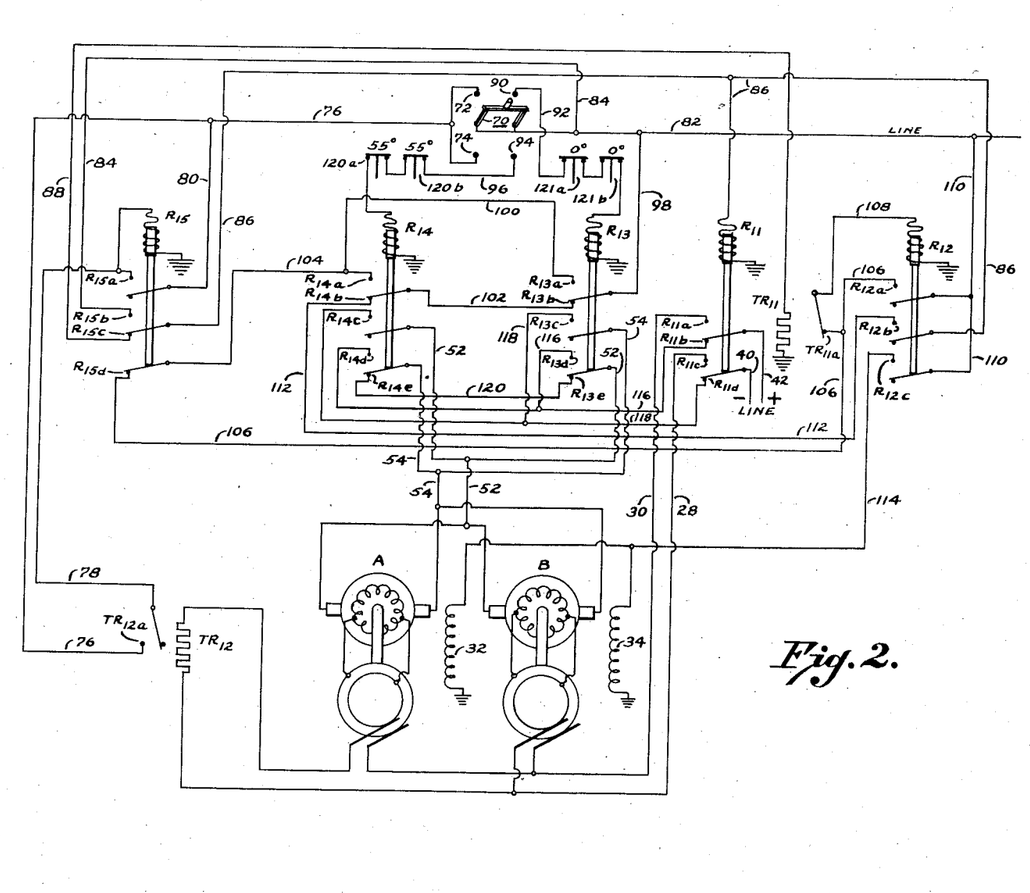
Fig. 2 is a wiring diagram illustrating another embodiment of my invention.

The circuits shown in the wiring diagram of Fig. 2 accomplish substantially the same results as those shown in Fig. 1 but require only a single manually operated switch, namely, the double pole double throw switch 70 which is thrown to one position to cause rotation of the motors in one direction and to the other position to cause rotation in the opposite direction. The motors are dynamically braked and positioned when the switch 70 is thrown to neutral from either position. The results obtained by the circuits shown in Fig. 2 differ primarily from the circuits shown in Fig. 1 in that in case of an overload in the slip ring circuit of the motors, they are automatically stopped and positioned, but will not start up again unless the manual switch 70 is thrown to neutral position and then closed again. Also, the motors are not positioned before starting, but this often is not important, as in many applications the motors cannot get out of position when stationary, and hence retain the correct angular positions which they received when previously stopped.

Contacts 72 and 74 of switch 70 are connected together and to the normally open contact $TR_{12a}$ of thermal relay $TR_{12}$ by means of a conductor 76. The blade of relay $TR_{12}$ is connected through a conductor 78 to one side of the solenoid of relay $R_{15}$, the other side of which is grounded. Conductor 78 is also connected to the normally open contact $R_{15a}$, the blade of which is connected by means of a conductor 80 to conductor 76.

A conductor 82 leads from a suitable supply of direct current, such as the battery 10 of Fig. 1 and is connected to both blades of switch 70. A conductor 84 is connected to conductor 82 and to the normally open contact $R_{15b}$. The blade of relay $R_{15}$ which cooperates with the contact $R_{15b}$, as well as with contact $R_{15c}$, is connected by means of a conductor 86 to one side of the solenoid of relay $R_{11}$, the other side of which is grounded, and to the blade of relay $R_{12}$ which cooperates with normally open contact $R_{12b}$.

Normally closed contact $R_{15c}$ is connected by a conductor 88 to one side of the heating element of thermal relay $TR_{11}$, the other side of which is grounded.

Contact 90 of switch 20 is connected by conductor 92 to one side of the solenoid of relay $R_{13}$, the other side of which is grounded, while contact 94 of switch 70 is connected by conductor 96 to one side of the solenoid of relay $R_{14}$, the other side of which is grounded.

A conductor 98 connects conductor 82 with the blade of relay $R_{13}$ which cooperates with normally open contact $R_{13a}$ and normally closed contact $R_{13b}$. A conductor 100 connects contact $R_{13a}$ with normally open contact $R_{14a}$, while a conductor 102 connects contact $R_{13b}$ with the blade of relay of $R_{14}$ which cooperates with contact $R_{14a}$, as well as with normally closed contact $R_{14b}$. A conductor 104 connects contact $R_{14a}$ and hence conductor 100, with the blade of relay $R_{15}$ which cooperates with normally closed contact $R_{15d}$. This contact is connected by a conductor 106 with the normally closed contact $TR_{11a}$ of thermal relay $TR_{11}$ and with the normally open contact $R_{12a}$ of relay $R_{12}$. The blade of $TR_{11}$ is connected by conductor 108 with one side of the solenoid of relay $R_{12}$, the other side of which is grounded. A conductor 110 connects the blades of relay $R_{12}$ which cooperate with contacts $R_{12a}$ and $R_{12c}$, respectively, with the line 82. A conductor 112 connects normally open contact $R_{12b}$ with normally closed contact $R_{14b}$.

A conductor 114 connects the normally open contact $R_{12c}$ with one side of the respective field windings 32 and 34, the other side of each winding being grounded.

The conductors 40 and 42 connect the blades of relay $R_{11}$ with any suitable supply of direct current. The normally open contacts $R_{11a}$ and $R_{11c}$ are connected by means of conductors 30 and 28, respectively, with the slip rings of motors A and B, the heating element of thermal relay $TR_{12}$ being connected in series with the conductor 28.

A conductor 116 is connected to the normally closed contact $R_{11b}$ and to the normally open contacts $R_{13d}$ and $R_{14d}$ while a conductor 118 is connected to the normally closed contact $R_{11d}$ and to the normally open contacts $R_{13e}$ and $R_{14c}$. The commutator brushes of the motors A and B are connected in parallel to the conductors 52 and 54. Conductor 52 is connected to the blade of relay $R_{14}$ which cooperates with contact $R_{14e}$ and to the blade of relay $R_{13}$ which cooperates with contacts $R_{13d}$ and $R_{13e}$, while conductor 54 is connected to the blade of relay $R_{14}$ which cooperates with contacts $R_{14d}$ and $R_{14e}$ and to the blade of relay $R_{13}$ which cooperates with contact $R_{13c}$. Normally closed contacts $R_{13e}$ and $R_{14e}$ are connected together by means of a conductor 120. The operation of the circuit shown in Fig. 2 is as follows.

If the switch 70 is thrown to its upper position for operation of the motors in one direction, relay $R_{13}$ is energized directly by current supplied through conductor 92 from contact 90, thus closing contacts $R_{13a}$, $R_{13c}$, and $R_{13d}$ and opening contacts $R_{13b}$ and $R_{13e}$. Relay $R_{14}$ is not energized because contact 94 of switch 70 is open and consequently contacts $R_{14b}$ and $R_{14e}$ are closed while contacts $R_{14a}$, $R_{14c}$, and $R_{14d}$ are open.

Relay $R_{15}$ is not energized because contact $TR_{12a}$ of thermal relay $TR_{12}$ is open. Consequently, contacts $R_{15c}$ and $R_{15d}$ are closed while contacts $R_{15a}$ and $R_{15b}$ are open.

Relay $R_{12}$ is energized from the line 82 through conductor 98, contact $R_{13a}$, conductors 100 and 104, contact $R_{15d}$, conductor 106, contact $TR_{11a}$ and conductor 108. Consequently, contacts $R_{12a}$, $R_{12b}$, and $R_{12c}$ are closed.

Relay $R_{11}$ is not energized because contacts $R_{15b}$ and $R_{13b}$ are both open. The circuit from relay $R_{11}$ to contact $R_{13b}$ is through conductor 86, contact $R_{12b}$, conductor 112, contact $R_{14b}$ and conductor 102. The circuit from relay $R_{11}$ to contact $R_{15b}$ is directly through conductor 86 to the blade which cooperates with contacts $R_{15b}$ and $R_{15c}$. With $R_{15b}$ open and $R_{15c}$ closed, the circuit from relay $R_{11}$ continues from $R_{15c}$ through conductor 88 to the heating element of $TR_{11}$, but as both $R_{11}$ and $TR_{11}$ are grounded, no current flows. Relay $R_{11}$ being deenergized, contacts $R_{11b}$ and $R_{11d}$ are closed, while $R_{11a}$ and $R_{11c}$ are open.

The circuit to the heating coil of thermal relay $TR_{11}$ is not completed because contact $R_{13b}$ is open. This circuit is through conductor 88, contact $R_{15c}$, conductor 86, contact $R_{12b}$, conductor 112, contact $R_{14b}$ and conductor 102 to open contact $R_{13b}$.

Under these conditions, current from the line 40, 42 flows through contacts $R_{11d}$ and $R_{11b}$, conductors 118 and 116, contacts $R_{13c}$ and $R_{13d}$, and conductors 54 and 52 to the commutators of the two motors. No current is supplied from the line to the conductors 28 and 30 connected to the slip rings because the contacts $R_{11a}$ and $R_{11c}$ are open. The armature leads 52 and 54 of the motors are not short-circuited because contact $R_{13e}$ is open. Under these conditions, the motors will start and run in synchronism, although the armatures will not be angularly positioned immediately before they start.

If the switch 70 is thrown to its lower position, the motors run in the opposite direction, the circuits then being as follows.

Relay $R_{14}$ is energized directly by current supplied through contact 94 of switch 70 and conductor 96. Consequently, contacts $R_{14a}$, $R_{14c}$, and $R_{14d}$ are closed while contacts $R_{14b}$ and $R_{14e}$ are open.

Relay $R_{13}$ is not energized because contact 90 of switch 70 is open. Consequently, contacts $R_{13b}$ and $R_{13e}$ are closed while contacts $R_{13a}$, $R_{13c}$, and $R_{13d}$ are open. As was the case previously, relay $R_{15}$ is not energized because contact $TR_{12a}$ is open and consequently, contacts $R_{15b}$ and $R_{15c}$ are closed while contacts $R_{15a}$ and $R_{15d}$ are open. Current is supplied to energize relay $R_{12}$ from line 82 through conductor 98, contact $R_{13b}$, conductor 102, contact $R_{14a}$, conductor 104, contact $R_{15d}$, conductor 106, contact $TR_{11a}$ and conductor 108. Consequently, contacts $R_{12a}$, $R_{12b}$, and $R_{12c}$ are closed.

Relay $R_{11}$ is not energized because contacts $R_{15b}$ and $R_{14b}$ are both open and consequently, contacts $R_{11a}$ and $R_{11c}$ are open while contacts $R_{11b}$ and $R_{11d}$ are closed. The heating element of thermal relay $TR_{11}$ is not supplied with current because contact $R_{14b}$ is open.

Under these conditions, the field windings 32 and 34 are supplied with current from line 82 through conductor 110, contact $R_{12c}$ and conductor 114. Current from the line 40, 42 is supplied through contacts $R_{11d}$ and $R_{11b}$, conductors 118 and 116, contacts $R_{14c}$ and $R_{14d}$ and conductors 52 and 54 to the commutator brushes. It will be seen that the polarity of the brushes has been reversed with respect to what it was when the switch 70 was in its upper position and consequently, the motors A and B will start and operate synchronously but in a reverse direction.

After the motors have been operating in either direction, they may be stopped and angularly positioned by throwing the switch 70 from either its upper or lower position to neutral. When this is done, neither of the relays $R_{13}$ or $R_{14}$ is energized because both contacts 90 and 94 are open. Consequently, contacts $R_{13b}$ and $R_{13e}$ are closed while contacts $R_{13a}$, $R_{13c}$, and $R_{13d}$ are open and contacts $R_{14b}$ and $R_{14e}$ are closed while contacts $R_{14a}$, $R_{14c}$, and $R_{14d}$ are open.

Relay $R_{15}$ is not energized because both contacts 72 and 74 of switch 70 are open and also because contact $TR_{12a}$ is open. Consequently, contacts $R_{15c}$ and $R_{15d}$ are closed while contacts $R_{15a}$ and $R_{15b}$ are open.

Relay $R_{12}$ remains energized through its own holding circuit including conductor 110, contact $R_{12a}$, conductor 106, contact $TR_{11a}$ and conductor 108. Consequently, contacts $R_{12a}$, $R_{12b}$, and $R_{12c}$ are closed.

Relay $R_{11}$ is now energized through conductor 86, contact $R_{12b}$, conductor 112, contact $R_{14b}$, conductor 102, contact $R_{13b}$, and conductor 98 to the line 82. Consequently, contacts $R_{11a}$ and $R_{11c}$ are closed while contacts $R_{11b}$ and $R_{11d}$ are open.

Current is supplied to the heating element of thermal relay $TR_{11}$ through conductor 88, contact $R_{15c}$, conductor 86, contact $R_{12b}$, conductor 112, contact $R_{14b}$, conductor 102, contact $R_{13b}$ and conductor 98 from the line 82. Contact $TR_{11a}$ is closed but will open as soon as it becomes heated. Under these conditions, the field coils 32 and 34 are still excited by current supplied from the line 82 through the conductor 110, contact $R_{12c}$, and conductor 114. Current from the line 40, 42 is supplied through contacts $R_{11c}$ and $R_{11a}$, and conductors 28 and 30 to the slip rings of the motors. No current is supplied to the armature circuit 52, 54 because contacts $R_{11b}$ and $R_{11d}$ are open. On the other hand, the armature circuit is short-circuited through contact $R_{13e}$, conductor 120, and contact $R_{14e}$.

The short-circuiting of the armatures results in dynamic braking of the motors which brings them to a quick stop and the supply of direct current to the slip rings positions the armatures angularly with respect to each other.

After a predetermined length of time, the contact $TR_{11a}$ opens due to the heating of the heating element of thermal relay $TR_{11}$.

Relays $R_{13}$ and $R_{14}$ remain deenergized because both contacts 70 and 94 are open. Consequently, contacts $R_{13b}$ and $R_{13e}$ are closed and contacts $R_{13a}$, $R_{13c}$, and $R_{13d}$ are open, while contacts $R_{14b}$ and $R_{14e}$ are closed and $R_{14a}$, $R_{14c}$ and $R_{14d}$ are open.

Relay $R_{15}$ remains deenergized because both contacts 72 and 74 of switch 70 are open and also because contact $TR_{12a}$ is open. Consequently, contacts $R_{15c}$ and $R_{15d}$ are closed while 15a and $R_{15b}$ are open.

Relay $R_{12}$ is now deenergized inasmuch as contact $TR_{11a}$ is open. Consequently, contacts $R_{12a}$, $R_{12b}$, and $R_{12c}$ are open.

Relay $R_{11}$ is now deenergized because both contacts $R_{12b}$ and $R_{15b}$ are open.

The current is interrupted to the heating element of thermal relay $TR_{11}$ because contact $R_{12b}$ is open.

Under these conditions, no current is supplied to the armature brushes because contacts $R_{14c}$, $R_{14d}$, $R_{13c}$, and $R_{13d}$ are all open. The armature circuit remains short-circuited through contacts $R_{13e}$ and $R_{14e}$. The field current is interrupted inasmuch as $R_{12c}$ is open and no current is supplied to the slip rings inasmuch as contacts $R_{11a}$ and $R_{11c}$ are open. The motors consequently are at rest with all circuits open and the system is in condition to be started again when desired.

Thermal relay $TR_{12}$ is provided for the same purpose as was relay $R_6$ in Fig. 1, namely, to stop the motors in the event they become so unequally loaded that they would otherwise drop out of synchronism. Assuming the double pole double throw switch 70 is in its lower position, the relays $R_{14}$ and $R_{12}$ will be energized in the manner previously described, while relays $R_{13}$, $R_{15}$ and $R_{11}$ will not be energized and no current will be supplied to the heating element of thermal relay $TR_{11}$. If, under these conditions, the current flowing through the conductors 28 and 30 reaches too high a value, the heating element of relay $TR_{12}$ is heated sufficiently to close the contact $TR_{12a}$. This completes the circuit from contact 74 of switch 70 through conductors 76 and 78 to the solenoid of relay $R_{15}$ thus energizing this relay. Consequently, contacts $R_{15a}$ and $R_{15b}$ are closed and contacts $R_{15c}$ and $R_{15d}$ are open. The closing of $R_{15a}$ completes a holding circuit for relay $R_{15}$ through conductors 76 and 80, and consequently, the relay will remain energized after contact $TR_{12a}$ opens again due to the cooling of the heating element of relay $TR_{12}$. Relay $R_{14}$ remains energized through contact 94 and conductor 96 and consequently, contacts $R_{14a}$, $R_{14c}$ and $R_{14d}$ are closed while contacts $R_{14b}$ and $R_{14e}$ are open.

Relay $R_{13}$ remains deenergized, inasmuch as contact 90 is open and consequently, contacts $R_{13b}$ and $R_{13e}$ are closed while $R_{13a}$, $R_{13c}$ and $R_{13d}$ are open. Relay $R_{12}$ remains energized through contacts $TR_{11a}$ and $R_{12a}$ and consequently contacts $R_{12a}$, $R_{12b}$ and $R_{12c}$ are closed.

Relay $R_{11}$ becomes energized through the closing of contact $R_{15b}$, thus completing its circuit through conductors 86 and 84.

No current is supplied to the heating element of relay $TR_{11}$ inasmuch as the contact $R_{15c}$ is now open.

Under these conditions, the current supplied to the armature is interrupted inasmuch as contacts $R_{11b}$ and $R_{11d}$ are open. The current supplied to the field is maintained inasmuch as contact $R_{12c}$ remains closed. The closing of contacts $R_{11a}$ and $R_{11c}$ supplies direct current to the slip rings through conductors 28 and 30. The armatures are not short-circuited because contact $R_{14e}$ remains open. Consequently, the motors will be stopped and angularly positioned in the same manner as though switch 70 had been thrown to neutral position, with the exception that the motors will not be dynamically braked.

In order to start the motors again, it is necessary for the operator to throw the manual switch 70 to neutral which deenergizes relay $R_{15}$, inasmuch as both contacts 72 and 74 are open, and then to again close the switch, whereupon the motors will again start in the manner first described in connection with Fig. 2. If the unbalance in load has been removed, the motors will operate synchronously. Otherwise, the abnormal current flowing through the heating element of relay $TR_{12}$ will again close contact $TR_{12a}$ and the motors will be again stopped and positioned.

The circuits in accordance with Fig. 2 are suitable for the control of the motors A and B when employed for any general purpose. By the addition of so-called limit switches, these circuits may be used to control the motors A and B when the latter are employed for operating the landing flaps on an airplane. A landing flap consists of a pivotal lower wing section which in normal flight coincides with the contour of the wing, but which may be pivoted through a suitable angle, usually approximately 55°, so as to increase the lift of the wing thereby reducing the landing speed of the plane. A landing flap is provided in each of the wings and the motor A may be suitably geared to the flap in one wing and the motor B geared to the flap in the other wing so that the two flaps will be operated in synchronism.

As shown in Fig. 2, a pair of limit switches 120a and 120b are connected in series in the conductor 96 leading from the contact 94 to the relay R14. Limit switch 120a is normally closed, but is arranged to be opened automatically when the landing flap controlled by the motor A has been turned through the desired angle, such as 55°, while limit switch 120b is arranged to be opened when the flap controlled by motor B is turned through a like angle.

Limit switches 121a and 121b are connected in series in the conductor 92 leading from contact 90 to relay R13. These switches are normally closed but are arranged to be opened when the flaps controlled by the motors A and B respectively, have been turned to closed position, that is, to an angle of 0°.

When the pilot desires to land, he throws the switch 70 to its lower position, thus closing contacts 74 and 94. Inasmuch as limit switches 120a and 120b are both closed, the relay circuits will operate in the manner previously described and the motors A and B will be started and will run in synchronism. The motors will continue to operate in this manner until the landing flaps controlled thereby have been turned through the desired angle, whereupon the limit switches 120a and 120b will be opened. This will have exactly the same effect on the relay circuits as has the opening of switch 70, inasmuch as contacts 72 and 74 are connected only to the relay R15, which functions only in the event of an unbalance in the load on the motors. Consequently, when limit switches 120a and 120b open, the current supplied to the armatures of the motors will be interrupted and supplied instead to the slip rings, and the armatures will be short-circuited. As previously described, this results in dynamic braking and positioning of the motors in exactly the same way as though switch 70 had been opened by hand. It is advisable to provide a limit switch operated by the flap controlled by each motor in order to stop both motors in the event that one flap reaches its open position before the other, which might occur due to a faulty adjustment of the flaps.

When the pilot desires to close the landing flaps, he throws the switch 70 to its upper position, thus causing the motors A and B to rotate in the reverse direction, as previously described. This rotation continues until the landing flaps have reached their closed position, whereupon the limit switches 121a and 121b are opened which again has the same effect as throwing the manual switch 70 from its upper to neutral position.

Figure 3:
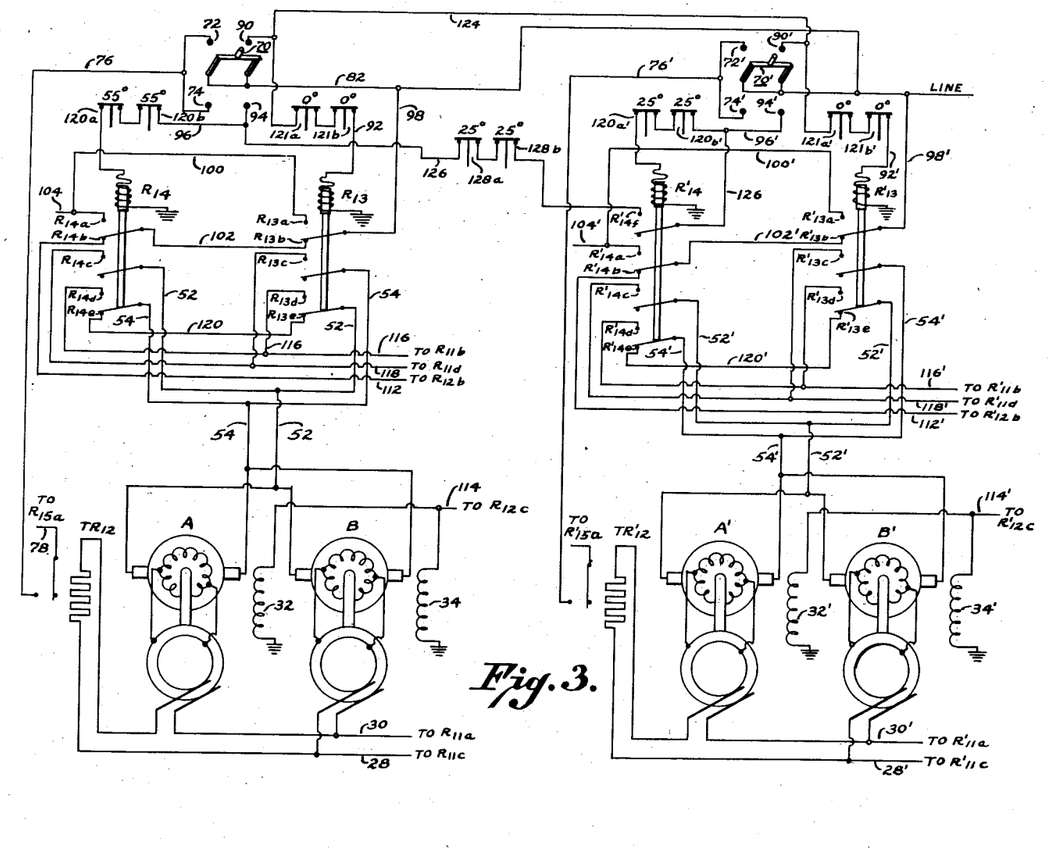
Fig. 3 is a wiring diagram showing an embodiment of my invention for controlling the motors operating both the landing and diving flaps of a dive bomber.

Airplanes designed for dive bombing are provided with diving flaps in the upper surfaces of the wings, as well as with the aforedescribed landing flaps in the lower surfaces. In diving, it is desirable to open both the diving and landing flaps to an angle of approximately 25°, whereas in landing, only the landing flaps are opened, but to an angle of 55°. Inasmuch as there are thus four flaps to be operated, two pairs of motors are required, one pair operating synchronously to control the landing flaps and the other pair operating synchronously to control the diving flaps. Duplicate relay circuits, each like that illustrated in Fig. 2, may be employed for controlling each of these pairs of motors, and moreover, the two circuits may be so interconnected that the throwing of one switch causes one pair of motors to open the landing flaps 55°, while the throwing of another switch causes all of the motors to open all of the flaps 25°. Closing of either switch in the opposite position from that to which it was thrown previously will cause whatever flaps are open to be closed. Such an arrangement is illustrated in Fig. 3. In the wiring diagram shown in this figure, only the relays $R_{13}$, $R_{14}$ and $TR_{12}$ of Fig. 2 have been shown, inasmuch as the relays $R_{11}$, $R_{12}$, $R_{15}$ and $TR_{11}$ would be connected and would operate in exactly the same manner as shown in Fig. 2 and described hereinabove. The same reference characters have been used in the relay circuits in Fig. 3 which directly control the motors A and B as have been used in Fig. 2, while the same reference characters primed have been used in the circuits controlling motors A' and B'. It is assumed that the motors A and B control the landing flaps while the motors A' and B' control the diving flaps.

As is shown in Fig. 3, conductors 92 and 92' which lead to relays $R_{13}$ and $R'_{13}$ respectively, are connected together by a conductor 124. Conductors 96 and 96' which lead to relays $R_{14}$ and $R'_{14}$, respectively, are connected together by means of a conductor 126. In this conductor there are connected in series limit switches 128a and 128b, and a normally open contact $R'_{14f}$ actuated by relay $R'_{14}$. Limit switches 128a and 128b are arranged to be opened by the landing flaps operated by motors A and B when these flaps have been opened to 25°.

When the pilot wishes to open the landing flaps, he throws the switch 70 to its lower position, thereby starting the motors A and B in exactly the same manner as described in connection with Fig. 2. The motors A' and B' are not started because contact $R'_{14f}$ is open and consequently the relay circuits controlling motors A' and B' are not affected. The motors A and B rotate until the landing flaps have been opened 55°, whereupon the limit switches 120a and 120b are opened, thus deenergizing relay $R_{14}$ and stopping the motors in the same manner as described in connection with Fig. 2. When the pilot wishes to close the landing flaps, he throws the switch 70 to its upper position, thus energizing relay $R_{13}$ and causing motors A and B to operate in the reverse direction until they have closed the landing flaps, whereupon the limit switches 121a and 121b are opened to stop the motors. Throwing the switch 70 to its upper position does not cause the motors A' and B' to operate because, although the conductors 92 and 92' are connected together through conductor 124, the limit switches 121a' and 121b' are open, inasmuch as the diving flaps are fully closed, and consequently no current reaches the relay $R'_{13}$.

When the pilot wishes to open the landing flaps to 25° and to open the diving flaps to 25°, he throws the switch 70' to its lower position.

This energizes relay R'14 through contact 94' and conductor 96'. Consequently, the motors A' and B' are started and run until the diving flaps are opened 25°. Thereupon, limit switches 120a' and 120b' are opened causing the motors to stop. At the same time, the energizing of relay R'14 closes contact R'14f and thus current is supplied from contact 94' through conductors 96' and 126, to conductor 96, thus energizing relay R14. This causes the motors A and B to start and to open the landing flaps to an angle of 25°. When the landing flaps have opened through this angle, they open the limit switches 128a and 128b, thus deenergizing relay R14, whereupon the motors A and B are stopped and positioned.

When the pilot wishes to close both the landing and diving flaps after the dive has been completed, he throws the switch 70' to its upper position. This energizes relay R'13 through conductor 92', thus causing the motors A' and B' to close the diving flaps. When the latter are fully closed, they open limit switches 121a' and 121b', thus stopping the motors A' and B'. At the same time, closing of switch 70' in its upper position causes current to flow through conductors 124 and 92 to relay R13. Consequently, motors A and B are caused to close the landing flaps. When the latter are fully closed, they open limit switches 121a and 121b, thus deenergizing relay R13 and stopping the motors A and B.

While certain specific embodiments of my invention have been shown, this has been done for the purpose of illustration only and it is to be understood that the scope of my invention is not to be limited thereby, but is to be determined by the appended claims.

What I claim is:

1. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon movement of said switch to one position to supply current to the commutator brushes, relay means operable upon movement of said switch to another position to interrupt the supply of current to said commutator brushes and to supply current to the slip ring brushes, and time delay relay means actuated upon movement of said switch to said other position for interrupting the supply of current to said slip ring brushes after a short lapse of time.

2. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon movement of said switch to one position to supply current to the slip ring brushes, time delay relay means operable upon movement of said switch to said one position to interrupt the supply of current to said slip ring brushes after a short lapse of time and to supply current to the commutator brushes, and relay means operable upon movement of said switch to another position to interrupt the supply of current to said commutator brushes.

3. In an electrical system, a plurality of similar electric motors each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon movement of said switch to one position to supply current to the slip ring brushes, time delay relay means operable upon movement of said switch to said one position to interrupt the supply of current to said slip ring brushes after a short lapse of time and to supply current to the commutator brushes, and relay means operable upon movement of said switch to another position to interrupt the supply of current to said commutator brushes and to supply current to said slip ring brushes.

4. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon movement of said switch to one position to supply current to the slip ring brushes, time delay relay means operable upon movement of said switch to said one position to interrupt the supply of current to said slip ring brushes after a short lapse of time and to supply current to the commutator brushes, relay means operable upon movement of said switch to another position to interrupt the supply of current to said commutator brushes and to supply current to said slip ring brushes, and time delay relay means actuated upon movement of said switch to said other position for interrupting the supply of current to said slip ring brushes after a short lapse of time.

5. In an electric system, a plurality of similar electric motors, each motor including a field, a wound rotor, a plurality of slip rings connected to the rotor winding at spaced points and a brush associated with each slip ring, a synchronizing circuit connecting the slip ring brushes of the several motors together, a source of electric current for operating said motors, and relay means operable by excess current supplied to one of said motors for overcoming an excess load on that motor, said relay means being operative while the motors are still running in synchronism to interrupt the supply of current to the motors.

6. In an electric system, an electric motor having a stationary field, a wound rotor, a commutator, a pair of brushes associated with said commutator, a source of current, a switch connected to control said current, relay means operable upon movement of said switch to one position to supply current to said brushes and to said field, relay means operable upon movement of said switch to another position to interrupt the supply of current to said brushes, and to short-circuit said brushes, and time delay means actuated upon movement of said switch to said other position for interrupting the supply of current to said field after a short interval.

7. In an electric system, an electric motor having a stationary field, a wound rotor, a commutator, a pair of brushes associated with said commutator, a source of current, a switch connected to control said current, relay means operable upon movement of said switch to one position to supply current to said brushes and to said field, relay means operable upon movement of said switch to another position to interrupt the supply of current to said brushes, and to short-circuit said brushes, and time delay means actuated upon movement of said switch to said other position for interrupting the supply of current to said field after a short interval, the first mentioned relay means also being operable upon movement of said switch to said one position to open said short circuit.

8. In an electric system, a plurality of similar electric motors, each motor including a stationary field, a wound rotor, a commutator, a pair of brushes associated with said commutator, a plurality of slip rings connected to the rotor windings at spaced points and a brush associated with each slip ring, a synchronizing circuit connecting the slip ring brushes of the several motors together, a source of electric current, means for connecting said source to the commutator brushes, and relay means connected in said synchronizing circuit and operable by the flow of excessive current through said synchronizing circuit while said motors are still running in synchronism for interrupting the supply of current to the commutator brushes of all of said motors.

9. In an electric system, a plurality of similar electric motors, each motor including a stationary field, a wound rotor, a commutator, a pair of brushes associated with said commutator, a plurality of slip rings connected to the rotor windings at spaced points and a brush associated with each slip ring, a synchronizing circuit connecting the slip ring brushes of the several motors together, a source of electric current, means for connecting said source to the commutator brushes, and relay means connected in said synchronizing circuit and operable by the flow of excessive current through said synchronizing circuit while said motors are still running in synchronism for interrupting the supply of current to the commutator brushes of all of said motors and for supplying current to the slip ring brushes of all of said motors, said relay means operable upon a cessation of flow of the excessive current in said synchronizing circuit for interrupting the supply of current to said slip ring brushes and for again supplying current to said armature brushes.

10. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon movement of said switch to one position to supply current to the commutator brushes, relay means operable upon movement of said switch to another position to interrupt the supply of current to said commutator brushes, to short circuit said commutator brushes and to supply current to the slip ring brushes, and time delay relay means actuated upon movement of said switch to said other position for interrupting the supply of current to said slip ring brushes after a short interval.

11. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, relay means operable upon closing of said switch in one position to supply current to said slip ring brushes, time delay relay means operable upon closing of said switch in said one position to interrupt the supply of current to said slip ring brushes after a short interval and to supply current to the commutator brushes, relay means operable upon closing of said switch in the other position to interrupt the supply of current to said commutator brushes, to short circuit said commutator brushes and to supply current to said slip ring brushes, and time delay relay means actuated upon closing of said switch in said other position for interrupting the supply of current to said slip ring brushes after a short interval.

12. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, two manually operable double throw switches connected to control said current, reversing relay means operable upon throwing one of said switches from one closed position to the other to reverse the polarity of the fields of said motors with respect to their armatures, relay means operable upon closing of the other of said switches in one position to supply current to the commutator brushes, and relay means operable upon closing of the last-mentioned switch in the other position to interrupt the supply of current to said commutator brushes and to supply current to the slip ring brushes.

13. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon closing of said switch to supply current to the commutator brushes, relay means operable upon opening of said switch to interrupt the supply of current to said commutator brushes and to supply current to the slip ring brushes, and time delay relay means actuated by opening of said switch for interrupting the supply of current to said slip ring brushes after a short interval.

14. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, reversing relay means operable upon throwing said switch from one closed position to the other to reverse the polarity of the fields of said motors with respect to their armatures, relay means operable upon closing of said switch in either position to supply current to the commutator brushes, and relay means operable upon opening said switch from either closed position to interrupt the supply of current to said commutator brushes and to supply current to the slip ring brushes.

15. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, reversing relay means operable upon throwing said switch from one closed position to the other to reverse the polarity of the fields of said motors with respect to their armatures, relay means operable upon closing of said switch in either position to supply current to the commutator brushes, relay means operable upon opening said switch from either closed position to interrupt the supply of current to said commutator brushes and to supply current to said slip ring brushes, and time delay relay means actuated by said opening of the switch for interrupting the supply of current to said slip ring brushes after a short interval.

16. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable switch connected to control said current, relay means operable upon closing said switch to supply current to the commutator brushes, a limit switch connected in series with said manual switch and arranged to be opened when one of said motors has rotated a predetermined amount, and relay means operable upon the opening of said limit switch to interrupt the supply of current to said commutator brushes and to supply current to the slip ring brushes.

17. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, reversing relay means operable upon throwing said switch from one closed position to the other to reverse the polarity of the fields of said motors with respect to their armatures, relay means operable upon closing of said switch in either position to supply current to the commutator brushes, a first limit switch connected in series with one pole of said double throw switch and arranged to be opened when one of said motors has rotated a predetermined amount in one direction, a second limit switch connected in series with the opposite pole of said double throw switch and arranged to be opened when one of said motors has rotated a like amount in the opposite direction, and relay means operable upon opening of the limit switch which is connected to the closed pole of said double throw switch to interrupt the supply of current to said commutator brushes and to supply current to the slip ring brushes.

18. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, reversing relay means operable upon throwing said switch from one closed position to the other to reverse the polarity of the fields of said motors with respect to their armatures, relay means operable upon closing of said switch in either position to supply current to the commutator brushes, a first limit switch connected in series with one pole of said double throw switch and arranged to be opened when one of said motors has rotated a predetermined amount in one direction, a second limit switch connected in series with the opposite pole of said double throw switch and arranged to be opened when one of said motors has rotated a like amount in the opposite direction, relay means operable upon opening of the limit switch which is connected to the closed pole of said double throw switch to interrupt the supply of current to said commutator brushes and to supply current to the slip ring brushes, and time delay means actuated by the opening of the last-mentioned limit switch for interrupting the supply of current to said slip ring brushes after a short interval.

19. In an electrical system, a plurality of similar electric motors, each motor including a stationary field, a wound rotor, a commutator, a pair of brushes associated with said commutator, a plurality of slip rings connected to the rotor winding at spaced points and a brush associated with each slip ring, a source of electric current, a manually operable double throw switch connected to control said current, a pair of reversing relays connected respectively to opposite poles of said switch and operable upon closing said switch in different positions to reverse the polarity of the fields of said motor with respect to their armatures, a first limit switch connected in series with one of said reversing relays and arranged to be opened to thereby deenergize the latter when one of said motors has rotated a predetermined amount in one direction, a second limit switch connected in series with the other reversing relay and arranged to be opened to thereby deenergize the latter when one of said motors has rotated a like amount in the opposite direction, and relay means operable upon deenergization of the reversing relay which is connected to the closed pole of the double pole switch to interrupt the supply of current to said commutator brushes and to supply current to the slip ring brushes.

20. In an electric system, a first motor, a second motor, a first double throw switch, a second double throw switch, relay means operable upon closing the first switch in one position to cause rotation of said one motor, means to stop said one motor when it has rotated a predetermined amount, relay means operable upon closing said first switch in the other direction to cause reverse rotation of said one motor, means to stop said one motor when it has rotated the same predetermined amount in the reverse direction, relay means operable upon closing the second switch in one position to cause rotation of both of said motors, means to stop both motors when they have rotated predetermined amounts which differ from the first mentioned amount, relay means operable upon closing the second switch in the other position to cause reverse rotation of both motors, and means to stop both motors when they have rotated the second-mentioned predetermined amounts in the reverse direction.

21. In an electric system, a first group of motors, a second group of motors, a first double throw switch, a second double throw switch, relay means operable upon closing the first switch in one position to cause rotation of the motors of the first group, a first limit switch arranged to be actuated when one of the motors of said first group has rotated a predetermined amount, means operable upon actuation of said limit switch to stop the motors of said first group and angularly position their armatures, relay means operable upon closing the first switch in the other position to cause reverse rotation of the motors of the first group, a second limit switch arranged to be actuated when one of the motors of said first group has rotated the same predetermined amount in the reverse direction, means operable upon actuation of said second limit switch to stop the motors of said first group and angularly position their armatures, relay means operable upon closing the second double throw switch in one position to cause rotation of the motors of both groups, third and fourth limit switches arranged to be actuated when one of the motors of the first group and one of the motors of the second group, respectively, have rotated a predetermined amount differing from the first-mentioned amount, means operable upon actuation of said third and fourth limit switches for stopping the motors of both groups and angularly positioning their armatures, relay means operable upon closing said second double throw switch in the other position to cause reverse rotation of the motors of both groups, a fifth limit switch arranged to be actuated when one of the motors of the second group has rotated the second-mentioned amount in the reverse direction, and means operable upon actuation of said fifth limit switch for stopping the motors of the second group and angularly positioning their armatures, said second limit switch being actuated when one of the motors of the first group has rotated said second-mentioned amount in the reverse direction, whereby the means operable upon actuation of said second limit switch stops the motors of said first group and angularly positions their armatures.

22. In an electric system, a first group of similar electric motors, a second group of similar electric motors, each motor including a stationary field, a wound rotor, a commutator, a pair of brushes associated with said commutator, a plurality of slip rings connected to the rotor windings at spaced points and a brush associated with each slip ring, a first double throw switch, a second double throw switch, two sets of reversing relays operable upon closing of the respective switches in different positions to reverse the direction of rotation of the motors of the respective groups, two sets of relay means operable upon closing of the respective switches in either position to supply current to the commutator brushes of the motors of the respective groups, a first limit switch connected in series with one pole of said first double throw switch and arranged to be opened when one of the motors of said first group has rotated a predetermined amount, a second limit switch connected in series with the other pole of said first double throw switch and arranged to be opened when one of the motors of said first group has rotated the same predetermined amount in the reverse direction, a third limit switch connected in series with one pole of the second double throw switch and arranged to be opened when one of the motors of the second group has rotated a lesser predetermined amount in a forward direction, a fourth limit switch connected in series with the other pole of said second double throw switch and arranged to be opened when one motor of said second group has rotated said lesser amount in the reverse direction, a conductor connecting said one pole of said first double throw switch with said one pole of said second double throw switch, a fifth limit switch connected in said conductor and arranged to be opened when one of the motors of said first group of motors has rotated said lesser amount in a forward direction, a relay controlled switch in said conductor in series with said fifth limit switch, relay means connected to said one pole of said second double throw switch for closing said relay controlled switch, a conductor connecting said other pole of said first double throw switch with said other pole of said second double throw switch, and two sets of relay means operable upon opening of the limit switches which are connected to the closed poles of the respective double pole switches to interrupt the supply of current to the commutator brushes and to supply current to the slip ring brushes of the motors of the respective groups.

23. An electrical system as set forth in claim 22 including two time delay relays operable upon opening of said limit switches which are connected to the closed poles of the respective double throw switches to interrupt the supply of current to the slip ring brushes of the motors of the respective groups after a short interval.

24. An electrical system as set forth in claim 22 including relay means operable upon opening of said limit switches which are connected to the closed poles of the respective double throw switches to short circuit the commutator brushes of the motors of the respective groups.

25. An electrical system as set forth in claim 22 including relay means operable upon opening of said limit switches which are connected to the closed poles of the respective double throw switches to short circuit the commutator brushes of the motors of the respective groups, and two time delay relays operable upon opening of said limit switches to interrupt the supply of current to the slip ring brushes of the motors of the respective groups after a short interval.

ERIC C. WAHLBERG.